July 10, 1928.  1,676,476
A. CARLSON
AUTOMOBILE BODY CONSTRUCTION
Filed March 24, 1923
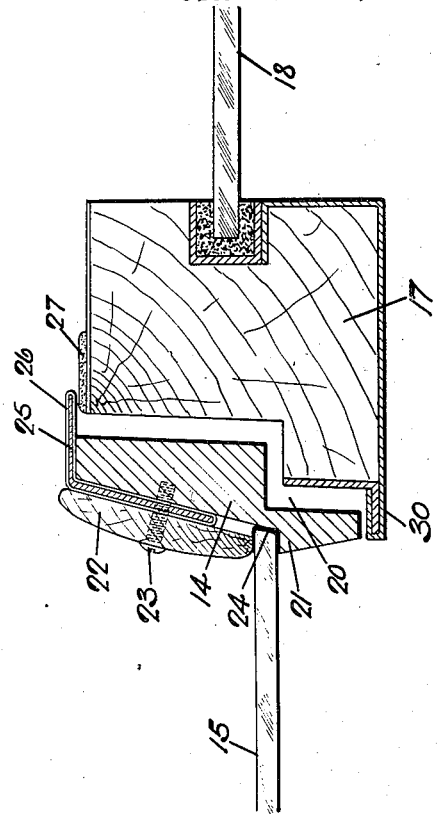
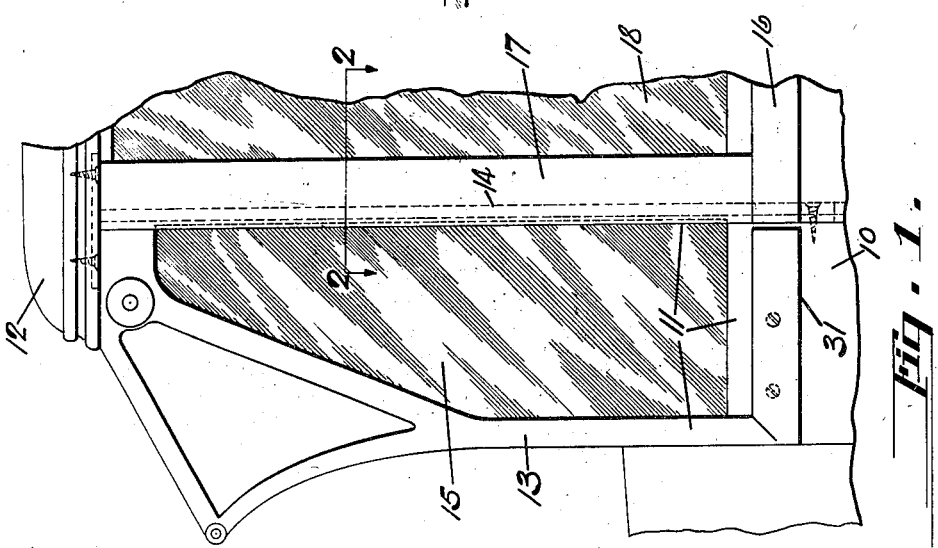
Witnesses.
Inventor.
Alexander Carlson
By
his Attorney.

Patented July 10, 1928.

1,676,476

UNITED STATES PATENT OFFICE.

ALEXANDER CARLSON, OF DAYTON, OHIO, ASSIGNOR TO DAYTON-WRIGHT COMPANY, OF DAYTON, OHIO, A CORPORATION OF DELAWARE.

AUTOMOBILE BODY CONSTRUCTION.

Application filed March 24, 1923. Serial No. 627,480.

This invention relates to improvements in automobile bodies, particularly of the closed body types. One object of the invention is the reduction of the width of the sight barrier in a closed body formed by the combined front pillar of the body and the forward frame member of the door. Ordinarily this front pillar is of a size approximating that of the forward frame member of the door and hence the two together placed side by side form quite a wide sight barrier. By this invention the width of this sight barrier is greatly reduced by a construction which in effect sets the front pillar within a recess in the door frame member so that the total width of the two is substantially that of the door frame member alone.

Another object is to provide a construction of very neat appearance when viewed from the outside, since the front pillar is substantially concealed by the forward door frame member.

Further objects and advantages of the present invention will be apparent from the following description, reference being had to the accompanying drawings, wherein a preferred form of embodiment of the present invention is clearly shown.

In the drawings:

Fig. 1 is a side elevation of the forward portion of an automobile body embodying this invention, and showing the front pillar entirely concealed by the door when it is in closed position.

Fig. 2 is a section on line 2—2 of Fig. 1 and shows in detail the construction of a metallic front pillar and wooden door frame member.

Similar reference characters refer to similar parts throughout the several views.

In Fig. 1, 10 represents the body proper of an automobile of the closed body type. The combined front pillar and windshield standard is preferably made of a single casting 11 which is rigidly secured to the body 10 at the bottom and to the automobile top 12 by any suitable means such as by concealed bolts or screws. This casting 11 is in the form of a frame having two upright standards, the front standard 13 carrying the windshield and the rear standard 14 serving as a door jamb for the body door 16. The front standard 13 is inclined, as clearly illustrated, in order to give an inclined front windshield, while the rear standard 14 is substantially vertical for the purpose of serving as a door jamb. A panel of glass 15 is inserted within the frame 11 between the columns 13 and 14 and attached thereto in any suitable manner.

The door 16 has a wooden forward frame member or "door post" 17 of sufficient cross section to give the desired rigidity and strength to the door. This door post 17 is recessed on its forward inner edge at 20, as clearly shown in Fig. 2, for the purpose of receiving the front pillar 14 therein, even after allowing for the proper clearance between the pillar 14 and the door member 17. Of course the door may be cushioned upon the door jamb in the ordinary way by means of small rubber cushions (not shown) attached to the door jamb or to the door in any suitable manner. The door is provided with a glass panel 18 therein, which preferably is substantially in the same plane with the glass panel 15. This glass panel 15 is preferably secured to the standard 14 by being held against the shoulder 21 on standard 14 by a wooden strip 22 which is screwed to standard 14 by the screws 23, as clearly shown in Fig. 2. The edge of the glass 15 is protected by the tape 24 which may be of rubber or other cushioning material. An angular metal strip 25, which is preferably trimmed with cloth 26, is inserted between the wood strip 22 and post 14 and has a projecting flange which serves to conceal the clearance space between the standard 14 and the door from the inside of the body. 27 is a trimming strip of cloth secured to the door.

The door 16 is provided with a projecting flange 30 extending throughout the full length of its outer front edge for concealing the clearance space between the door and door jamb from the outside of the body. The forward edge of this projecting flange 30 lies substantially flush with the forward edge of pillar 14, as clearly shown in Fig. 2, and thereby substantially conceals the entire pillar 14, as shown in Fig. 1. This construction has the advantage of greatly improving the neat appearance from the outside of the body, as well as materially decreasing the blind angle of the driver by reducing the combined width of the door frame member 17 and front pillar 14. The front pillar 14 being of metal and being braced by the standard 13 possesses sufficient strength and rigidity for its purposes even though it is of comparatively narrow section.

Of course, if desired, the standard 14 and the windshield standard 13 instead of being a single casting could be made separate and rigidly secured together at the bottom and top by any suitable means such as bolts or rivets. The standard 14 preferably extends a short distance below the moulding shown at 31 in order to provide for a rigid connection between the body frame members and the standard 14, as will be readily understood by those skilled in the art.

While the drawings illustrate an automobile body having a door hinged at the rear edge, it is to be understood that the principles of this invention may be equally well employed when the door is hinged at its front edge by having the axis of the hinges forward of the tip of flange 30, as will be readily understood by those skilled in the art.

While the form of embodiment of the invention as herein disclosed, constitutes a preferred form, it is to be understood that other forms might be adopted, all coming within the scope of the claims which follow.

What I claim is as follows:

1. In an automobile closed body, a door having a front door post and a glass panel attached thereto, said door post having a recess on its forward edge forming a vertical shoulder thereon of considerable width, a metallic front body pillar having a transverse width approximately equal to that of said door post but having a relatively small longitudinal width, said pillar having a vertical shoulder thereon opposed to and internesting with the shoulder in said door post, said door post having a flange on its forward outside edge which substantially conceals the relatively narrow portion of said pillar which would otherwise be exposed when viewed from the outer side.

2. In an automobile closed body, a door, a front pillar casting having a vertical member serving as a door jamb for said door and an inclined member serving as a windshield standard, and a glass panel between said vertical and inclined members, said vertical member having a materially smaller longitudinal width than transverse width, and said door being sufficiently recessed on its forward inner side to bodily receive and substantially conceal said vertical member.

In testimony whereof I hereto affix my signature.

ALEXANDER CARLSON.